(12) United States Patent
Sinnaduray

(10) Patent No.: US 9,549,410 B2
(45) Date of Patent: Jan. 17, 2017

(54) INTERFERENCE MITIGATING CELLULAR NETWORK

(71) Applicant: Verizon Patent and Licensing Inc., Arlington, VA (US)

(72) Inventor: David Sanjiv Sinnaduray, Berkeley, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 64 days.

(21) Appl. No.: 14/458,778

(22) Filed: Aug. 13, 2014

(65) Prior Publication Data
US 2016/0050676 A1    Feb. 18, 2016

(51) Int. Cl.
*H04W 72/08* (2009.01)
*H04L 5/00* (2006.01)
*H04W 72/04* (2009.01)

(52) U.S. Cl.
CPC .............. *H04W 72/082* (2013.01); *H04L 5/00* (2013.01); *H04W 72/042* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2011/0136497 A1* | 6/2011 | Youtz | H04B 1/1027 455/452.2 |
| 2011/0228732 A1 | 9/2011 | Luo et al. | |
| 2012/0120885 A1 | 5/2012 | Wang et al. | |
| 2012/0207067 A1* | 8/2012 | Malladi | H04L 5/0007 370/281 |
| 2012/0329514 A1 | 12/2012 | Noh et al. | |
| 2013/0065599 A1 | 3/2013 | Chan et al. | |
| 2013/0195048 A1 | 8/2013 | Ekpenyong et al. | |
| 2013/0265968 A1* | 10/2013 | Palanki | H04W 72/0413 370/329 |
| 2014/0098761 A1 | 4/2014 | Lee et al. | |

* cited by examiner

*Primary Examiner* — Yemane Mesfin
*Assistant Examiner* — Jeff Banthrongsack

(57) ABSTRACT

Interference mitigation methods and systems are provided. A base station obtains physical channel information of a transmission signaled in a first frequency band between the base station and at least one user equipment (UE) associated with the base station. The transmission corresponds to at least one of an uplink communication or a downlink communication. An interference mitigation controller compares the obtained physical channel information to a predetermined interference condition, to identify a presence of interference in the transmission. A second frequency band different from the first frequency band is selected, responsive to the identified presence of interference. The base station sends an instruction to the at least one UE associated with the base station to signal using the selected second frequency band. At least one of the first frequency band and the second frequency band includes a Long Term Evolution (LTE) band.

20 Claims, 10 Drawing Sheets

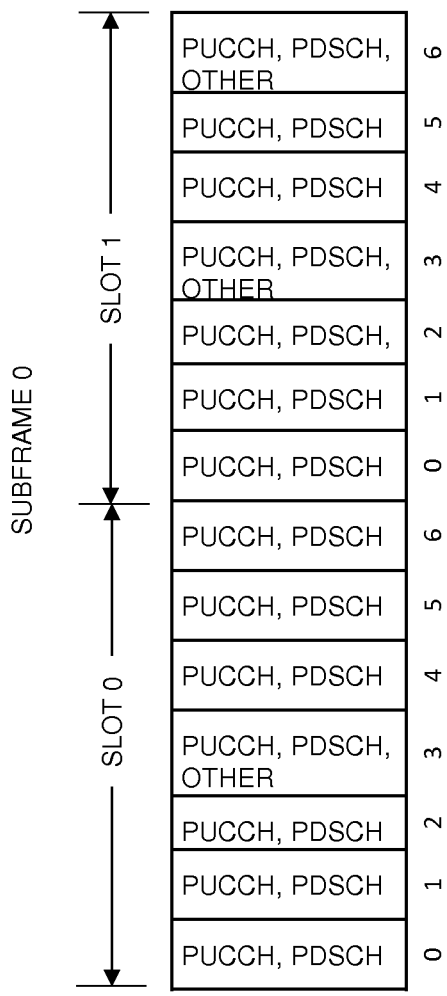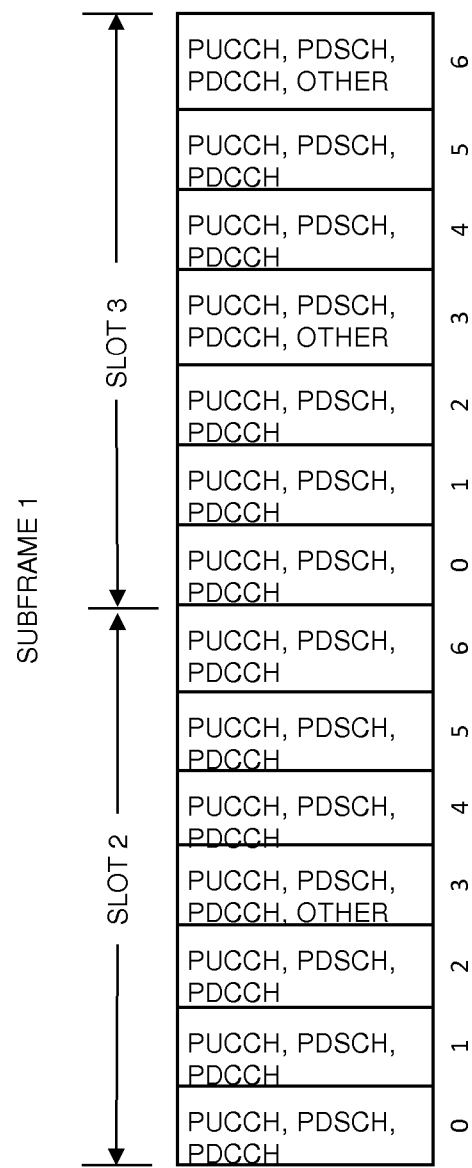

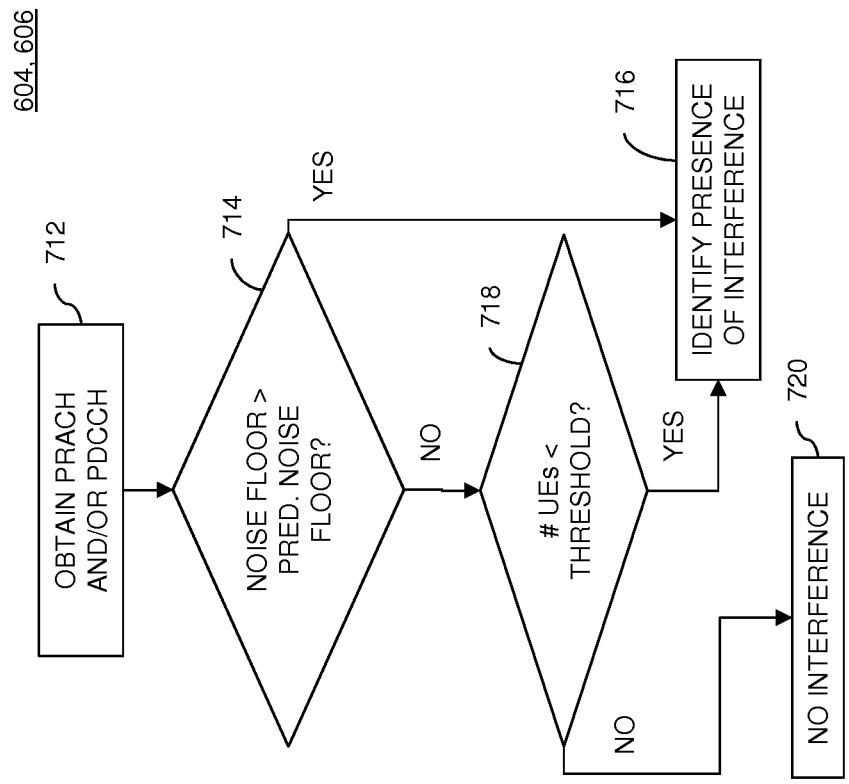
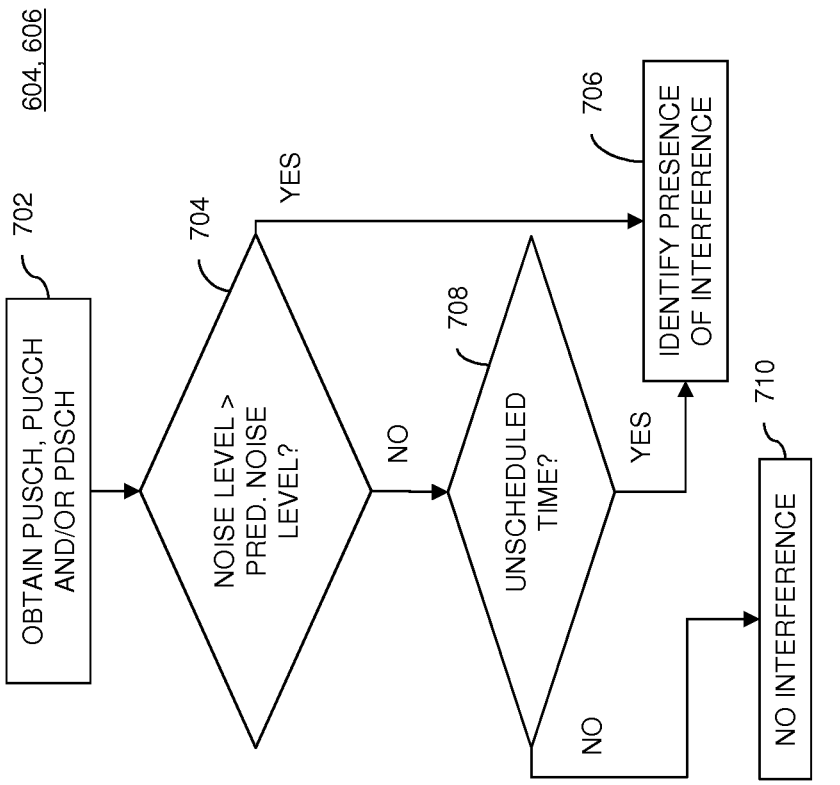

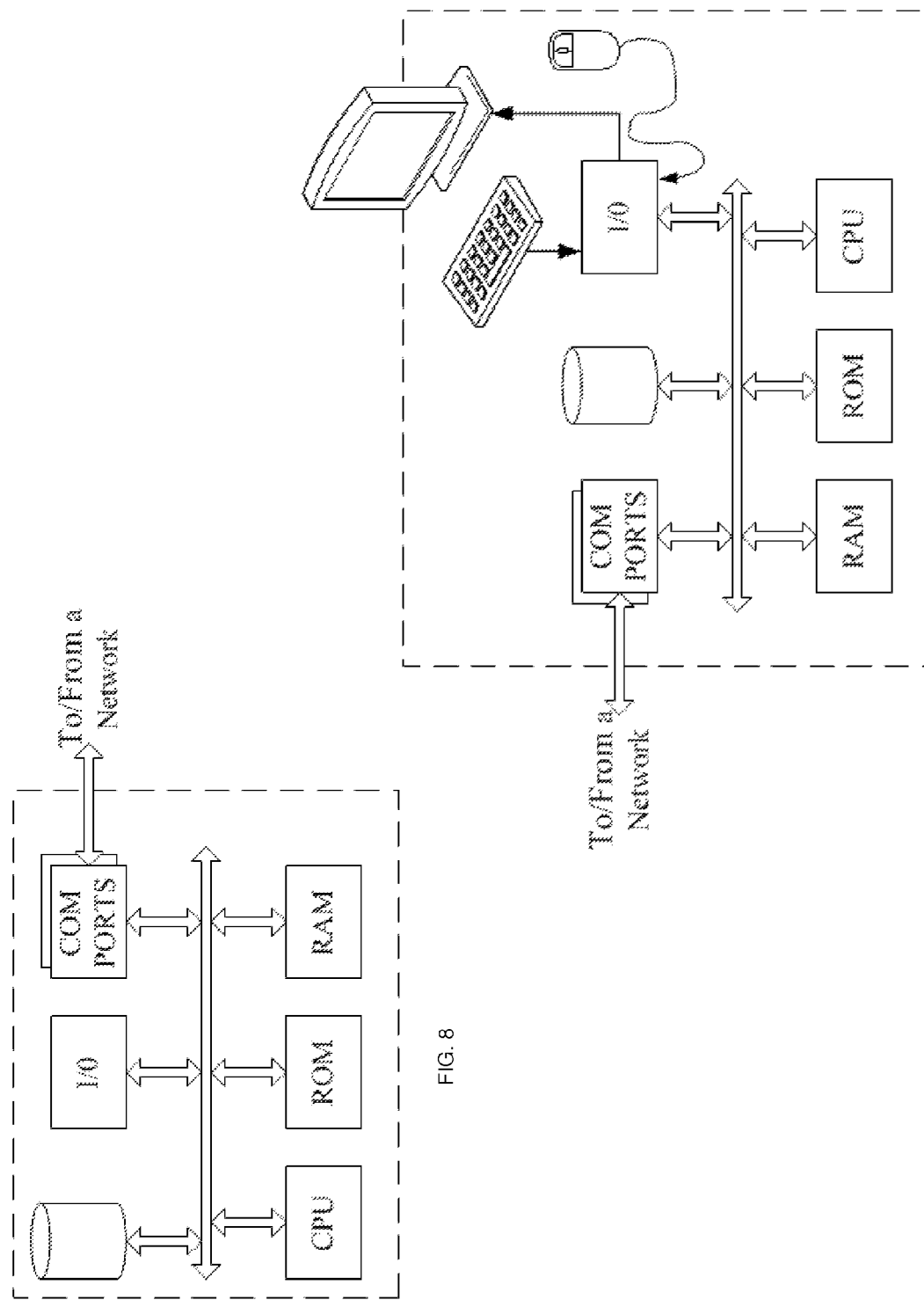

INTERFERENCE MITIGATING CELLULAR NETWORK

BACKGROUND

Consumer adoption of user equipment (UE) such as cellular telephones, laptop computers, pagers, personal digital assistants, and the like, is increasing. These devices can be used in a wireless communication network for a diversity of purposes ranging from basic communications, to conducting business transactions, to managing entertainment media, as well as a host of other tasks. Given the sophistication of data applications in addition to traditional voice, these UEs are continually transmitting over the air.

A wireless communication network may include a number of base stations that can support communication for a number of UEs. Transmissions from a base station to a UE may encounter interference due to transmissions from neighboring base stations or from other wireless radio frequency (RF) transmitters. Transmissions from a UE to a base station may encounter interference from other UEs communicating with the same base station, with neighboring base stations or from other wireless RF transmitters. The interference may degrade the performance of the wireless communication network. The increased usage of UEs and corresponding demand on the service provider to support increased capacity have posed greater challenges in minimizing interference.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 5A and 5B are diagrams illustrating an example resource allocation in a frame structure for uplink communication.

FIG. 7A is a flow chart diagram illustrating an example of interference identification based on physical channel information.

FIG. 7B is a flow chart diagram illustrating another example of interference identification based on physical channel information.

FIG. 8 is a simplified functional block diagram of a computer that may be configured as a host or server, for example, to function as the interference mitigation controller in the system of FIG. 1.

FIG. 9 is a simplified functional block diagram of a personal computer or other work station or terminal device.

DETAILED DESCRIPTION OF EXAMPLES

Figure 1:
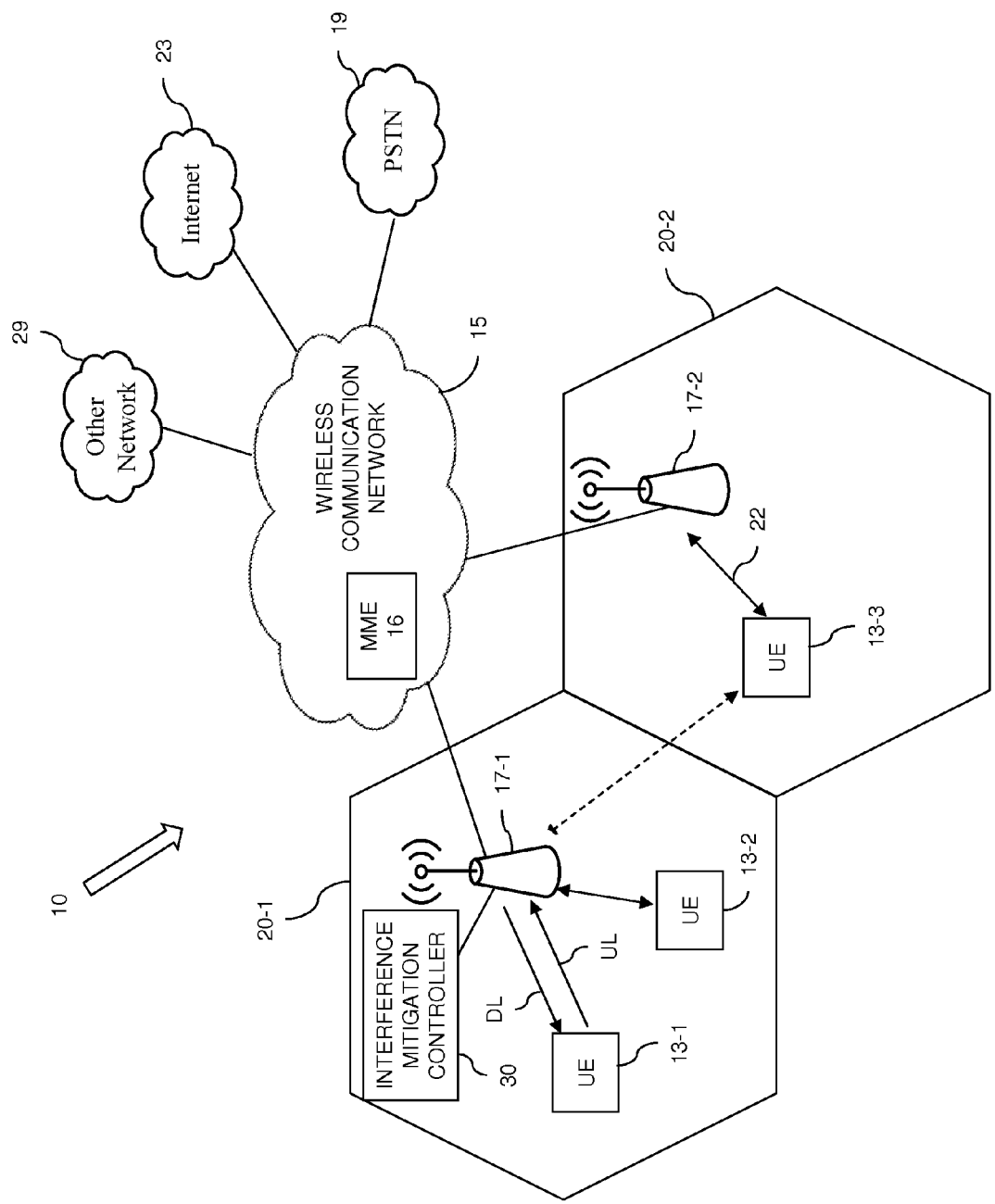
FIG. 1 is a high-level functional block diagram of an example of a system that supports an example of an interference mitigation control service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to interference mitigation methods and interference mitigation control systems. A base station obtains physical channel information of a transmission signaled in a first frequency band between the base station and at least one user equipment (UE) associated with the base station. The transmission corresponds to at least one of an uplink communication or a downlink communication. An interference mitigation controller compares the obtained physical channel information to a predetermined interference condition, to identify a presence of interference in the transmission. The interference mitigation controller selects a second frequency band different from the first frequency band, responsive to the identified presence of interference. The base station sends an instruction to the at least one UE associated with the base station to signal using the selected second frequency band. At least one of the first frequency band and the second frequency band includes a Long Term Evolution (LTE) band. In some examples, the second frequency band does not include frequencies that overlap with frequencies of the first frequency band. For example, the first frequency band may include an LTE band 13 (i.e., about 700 MHz) and the second frequency band may include an LTE band 4 (i.e., about 1700 MHz uplink and about 2100 MHz downlink). In some examples, the second frequency band includes a portion of the first frequency band excluding a sub-band of the first frequency band in which the interference is identified.

The physical channel information may be obtained from one or more uplink physical channels and/or downlink physical channels. The predetermined interference condition includes at least one of a predetermined noise floor, a predetermined number of UEs expected to interact with the base station, a predetermined noise level, a predetermined signaling time schedule, resource allocation information, a predetermined number of UEs associated with the allocated resource information or at least one predetermined sub-band of the first frequency band. In some examples, the physical channel information may be periodically monitored.

According to some examples, if a base station of cell site experiences high interference (i.e., greater than a predetermined tolerance) on a first LTE band, the base station can automatically push some or all existing traffic over to the second LTE band. As an example, if cell site A identifies about 25% of all incoming measurements above a signal level of about −107 dBm reference signal receive power (RSRP) on the band 13 700 MHz spectrum, the base station shifts one or more UEs that have a cellular transceiver capable of also operating on the band 4 AWS spectrum from LTE band 13 over to the LTE band 4 spectrum. Currently, users can be blocked from the cell site during high interference events, preventing the successful transmission of data and calls. The use of a second frequency band may reduce the occurrence of cell coverage dropout and lessen a negative impact on a user's experience with the cellular network. The use of a second frequency band during interference events also allows technicians time to locate the source of the interference (which can sometimes take several weeks, especially if the interference waxes and wanes). Cell traffic may be reshaped (to its previous equilibrium) once the presence of interference is no longer detected and the base station reverts to inclusion of the first frequency band.

In some examples, the base station switches one or more UEs to the second frequency band when a predetermined percentage of measurements of signals from the UEs (e.g., from 30% of the UEs currently communicating with the base station) are below a predetermined signal level. In some examples, different UEs may be associated with different predetermined signal level thresholds. For example, a first UE, a second UE and a third UE may be associated with respective signal level thresholds of −80 dBm RSRP, −90 dBm RSRP and −100 dBm RSRP. The base station can switch the first, second and third UEs to the second frequency band when their respective signal levels fall below the corresponding thresholds. In some examples, the base station assigns different priorities to the UEs associated with the base station. UEs with higher priority may be requested to switch to the second frequency band, whereas lower priority UEs may not be requested to switch. For example, UEs that typically experience higher traffic may be assigned to a higher priority. In some examples, the identification of interference (such as based on one or more signal level thresholds, the percentage of UEs experiencing interference and/or via prioritization) may vary depending on the time of day, the day of week, any expected events (such as a sporting event or a holiday), etc., which may alter the usage of the UEs.

Reference now is made in detail to the examples illustrated in the accompanying drawings and discussed below. FIG. 1 is a high-level functional block diagram of an example of a system of networks/devices that provides various communications for UEs and supports an example of the interference mitigation control service. The system 10 (also referred to as network 10) includes a number of base stations (referred to collectively herein as "base stations 17" and individually as "base station 17"), a wireless communication network 15 and other network entities (for example, public switched telephone network (PSTN) 19, Internet 23, other network 29, and the like). An interference mitigation controller 30 is communicatively coupled to the base station 17-1. The interference mitigation controller 30 identifies the presence of interference between components in the network 10 (signaling on a first frequency band) and switches the signaling of the components to a second frequency band. Although not shown, an interference mitigation controller 30 may also be communicatively coupled to the base station 17-2. In some examples, the interference mitigation controller 30 is separate from (i.e., external to) the base station 17. For example, the interference mitigation controller 30 may be located on a server (outside of cell 20-1, such as in network 15) that is communicatively coupled to the base station 17. In other examples, the interference mitigation controller 30 may be part of (i.e., internal to) the base station 17.

The present techniques may be implemented in any of a variety of available wireless networks 15 and/or on any type of UE (referred to collectively herein as "UEs 13" and individually as "UE 13") compatible with such a network 15, and the drawing shows only a very simplified example of a few relevant elements of the network 15 for purposes of discussion herein. The network 10 provides communications between the UEs 13 as well as communications for the UEs 13 within networks and devices outside the wireless communication network 15.

The network 15 allows users of UEs 13 (and other mobile devices not shown) to initiate and receive telephone calls to each other as well as through the PSTN 19. The network 15 also typically offers a variety of data services via the Internet 23, such as downloads, web browsing, email, etc. The carrier also operates a number of systems that provide ancillary functions in support of the communications services and/or application services provided through the network 10, and those elements may communicate with other nodes or elements of the network 10 via one or more private IP type packet data networks 29 (sometimes referred to as an Intranet), i.e., a private network.

The wireless communication network 15 (i.e., a cellular network) might be implemented as a network conforming to the $3^{rd}$ Generation Partnership Project (3GPP) LTE standard, code division multiple access (CDMA) IS-95 standard, the 3rd Generation Partnership Project 2 (3GPP2) wireless IP network standard, the Evolution Data Optimized (EVDO) standard, the Global System for Mobile (GSM) communication standard, a time division multiple access (TDMA) standard, an Orthogonal Frequency-Division Multiple Access (OFDMA) standard or other standards used for public wireless communications. The UEs 13 are capable of wireless communications through the network 15.

The base stations 17 in the examples described below are evolved node Bs (eNodeBs or eNBs), and the base stations 17 and the wireless communication network 15 operate according to the LTE standard. Each base station 17 is communicatively coupled to the wireless network 15 and provides wireless communications to the UEs 13. The network 15 includes a mobility management entity (MME) 16 that processes signaling between the UEs 13 and the network 15 (via the base stations 17 in the cells 20) managed by the MME 16. The base station 17 facilitates the establishment of a communication session for the UEs 13 by forwarding control signals to the MME 16. The MME 16 may activate and deactivate bearer channels such as radio channels over the air and/or data network bearers. A bearer is a logical channel having particular service requirements. For example, the bearer may be a radio bearer between UE 13-1 and base station 17-1. The bearer may also be a data bearer between base station 17-1 and a serving gateway (SGW) in network 15 or a data bearer between gateways in network 15. The MME 16 may also authenticate the UEs 13, and may interface with non-LTE radio access networks. In some examples, the network 15 includes an evolved packet core (EPC), including additional components (not shown), such as an SGW and a packet data network (PDN) Gateway.

Each base station 17 may provide communication coverage (i.e., communication services) for a particular geographic area (referred to collectively herein as "geographical areas 20" and individually as "geographical area 20", also referred to as a "cell"), which may be a macro cell, a pico cell, a femto cell, and/or other types of cell. In the example shown in FIG. 1, base station 17-1 provides communication coverage for geographic coverage area 20-1 and base station 17-2 provides communication coverage for geographic coverage area 20-2.

For example, the base station 17-1 communicates with UEs 13-1 and 13-2 for coverage area 20-1. The base station 17-2 communicates with UE 13-3 for coverage area 20-2. In FIG. 1, a solid line with double arrows indicates desired transmissions between a UE 13 and a serving base station 17, (i.e., a base station designated to serve the UE). A dashed line with double arrows indicates interfering transmissions between a UE and a base station (such as between base station 17-1 and UE 13-3). A UE 13 may communicate with more than one base station 17 if the cells 20 of the base stations 17 overlap. It is understood that the number of UEs 13, the number of base stations 17, the number of cells 20 and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1.

Each UE 13 may be stationary or mobile. A UE 13 may also be referred to as a terminal, a mobile station, a subscriber unit, a station, or the like. A UE 13 may be a cellular phone, a personal digital assistant (PDA), a wireless modem, a wireless communication device, a handheld device, a laptop computer, a personal computer (PC), a cordless phone, a tablet, or the like.

A UE 13 (such as the UE 13-1) may communicate with a base station 17 (such as the base station 17-1) via a downlink (DL) and an uplink (UL). The downlink refers to the communication link from the base station 17-1 to the UE 13-1, and the uplink refers to the communication link from the UE 13-1 to the base station 17-1. The base station 17-1 may transmit data and control information on the downlink to the UE 13-1 and/or may receive data and control information on the uplink from the UE 13-1.

On the downlink, a transmission from the base station (e.g., base station 17-1) may encounter interference due to transmissions from neighbor base stations (e.g., base station 17-2) or from other wireless RF transmitters (not shown). On the uplink, a transmission from the UE (e.g., UE 13-1) may encounter interference from uplink transmissions of other UEs communicating with the same base station (e.g., UE 13-2), interference from uplink transmissions of other UEs communicating with neighbor base stations (e.g., UE 13-3) or from other wireless RF transmitters.

Interference mitigation controller 30 monitors physical channel information from uplink and/or downlink LTE transmissions (described below with respect to FIGS. 3A and 3B) between the base station 17-1 (in the cell 20-1) and the UEs 13 (e.g., UE 13-1, UE 13-2). The LTE transmissions are signaled in a first frequency band (such as 700 MHz). The interference mitigation controller 30 identifies the presence of interference (such as from UE 13-3 and/or base station 17-2 in cell 20-2) based on the physical channel information. When the presence of interference is identified, the interference mitigation controller instructs the UEs 13-1, 13-2 in the cell 20-1 to signal at a second frequency band. The second frequency band may be different from the first frequency band (such as 1700 MHz) or may be a portion of the first frequency band that does not have interference. Interference mitigation controller 30 may also instruct the UEs 13 to switch from the second frequency band back to the first frequency band when the interference in the first frequency band is below a predetermined threshold. In some examples, the second frequency band may be monitored for interference. If the interference in the second frequency band is less than the interference in the first frequency band (or the second frequency band experiences less interference across a greater number of sub-bands than sub-bands of the first frequency band), the interference mitigation controller 30 may maintain signaling in the second frequency band. If the interference in the second frequency band is greater than the interference in the first frequency band (or experiences more interference across a greater number of sub-bands), the interference mitigation controller 30 may switch signaling to the first frequency band. Interference mitigation controller 30 is described further below with respect to FIG. 2.

In some examples, the downlink transmission is more likely than uplink transmissions to encounter interference, due to the different transmit power levels. The interference mitigation controller 30 may use different threshold levels for uplink and downlink interference to identify the presence of interference. The number of UEs 13 that are requested to switch to the second frequency band may also depend upon whether uplink or downlink interference is identified. For example, UEs 13-1 and 13-2 may be requested to switch to the second frequency band when downlink interference is identified and only UE 13-1 may be requested to switch to the second frequency band when uplink interference is identified.

Figure 2:
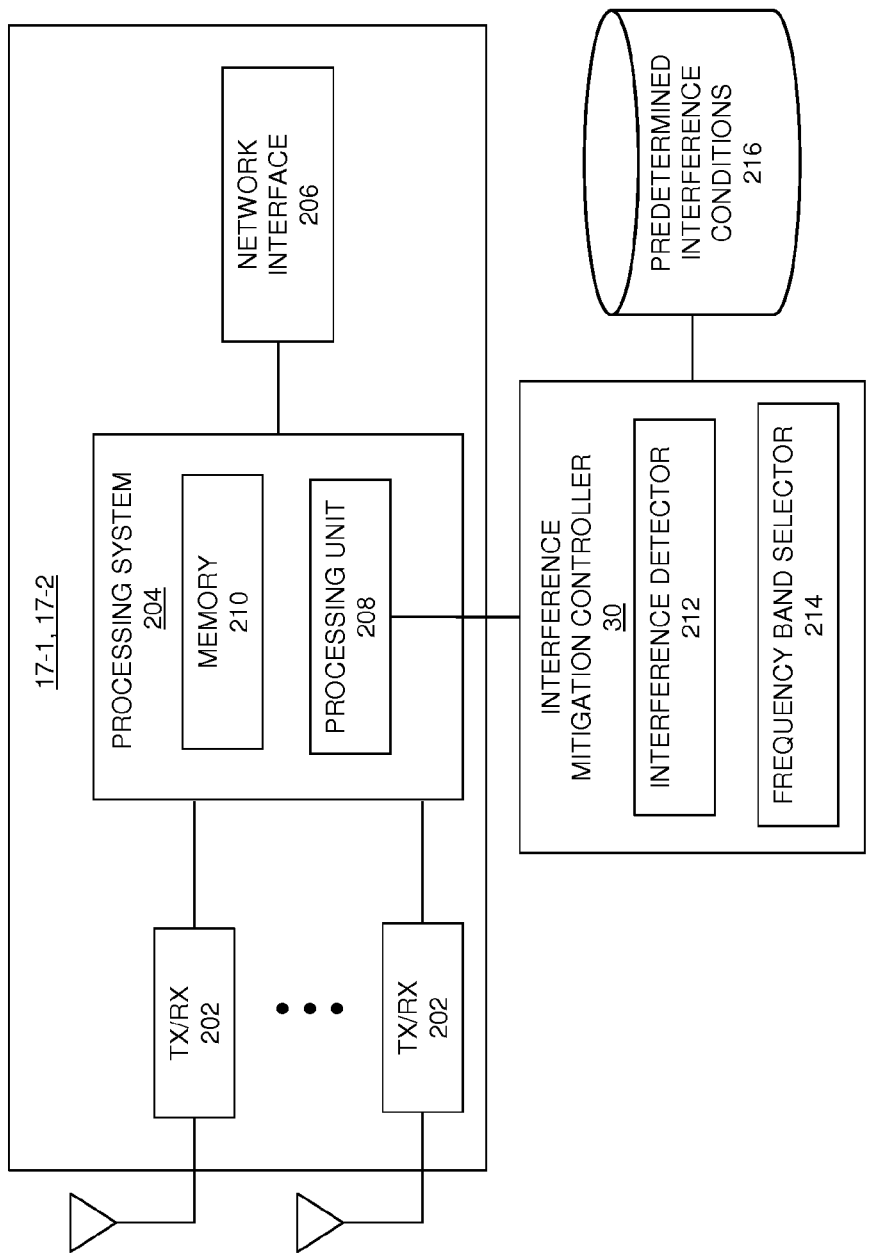
FIG. 2 is a high-level functional block diagram of an example of a base station and interference mitigation controller shown in FIG. 1.

FIG. 2 is a diagram of example functional components of base station 17 and interference mitigation controller 30. The base station 17 includes transceivers 202, a processing system 204 and a network interface 206 for communication with the network 15 (FIG. 1). Processing system 204 may control the operation of base station 17. The processing system 204 includes a processing unit 208 and a memory 210. The interference mitigation controller 30 detects the presence of interference (in a current frequency band used for signaling), selects an alternate frequency band (than the current frequency band) and indicates to the processing unit 208 to switch to the alternate frequency band. Responsive to the indication from interference mitigation controller 30, the processing system 204 instructs the UEs 13 (via the transceivers 204) to signal in the alternate frequency band.

In some examples, the alternate frequency band is selected based on the number of sub-bands of the first frequency band experiencing interference. If the number of sub-bands is greater than a predetermined threshold, the second frequency band may not overlap with the first frequency band. If the number of sub-bands is less than the predetermined threshold, those sub-bands that do not experience interference may be selected as the second frequency band. In another example, a percentage of UEs 13 that experience interference in the same frequency sub-bands (or across the first frequency band) may be used to select the alternate frequency band. In another example, interference in specific UEs 13 (such as those UEs having a high priority) may be analyzed. The number of sub-bands experiencing interference in the specific UEs 13 may be used to identify the alternate frequency band. In another example, the alternate frequency band is selected based on an aggregate throughput of active UEs 13. If the throughput on one band falls below an accepted threshold while the other band maintains an accepted throughput above a threshold, the alternate band may be selected.

The processing unit 208 of the base station 17 includes one or more processors, microprocessors, application specific circuits (ASICs), field programmable gate arrays (FPGAs), or the like. The processing unit 208 processes information received via the transceivers 202 and the network interface 206. The processing may include, for example, data conversion, forward error correction (FEC), rate adaptation, Wideband Code Division Multiple Access (WCDMA), spreading/despreading, quadrature phase shift keying (QPSK) modulation, etc. In addition, the processing unit 208 may transmit control messages and/or data messages, and cause those control messages and/or data messages to be transmitted via the transceivers 202 and/or the network interface 206. The processing unit 208 may also process control messages and/or data messages received from the transceivers 202 and/or the network interface 206.

Example memory 210 includes a random access memory (RAM), a read-only memory (ROM) and/or another type of non-transitory memory to store data and instructions that may be used by processing unit 208. In some examples, memory 210 stores predetermined interference conditions that are used by interference mitigation controller 30 to detect the presence of interference (examples of which are described further below with respect to FIGS. 7A-7C).

In FIG. 2, the processing unit 208 is illustrated as being communicatively coupled to the interference mitigation controller 30. In some examples, the interference mitigation controller 30 may be located on a server (not shown in the network 10). In some examples, the interference controller 30 may be a separate component internal to the base station 17. In some examples, the processing system 204 is configured to perform at least some or all of the processing performed by interference mitigation controller 30.

The interference mitigation controller 30 includes an interference detector 212 and a frequency band selector 214. The interference mitigation controller 30 is also communicatively coupled to a database 216 that stores predetermined interference conditions. In some examples, the database 216 may be located in the network 10. In other examples, the database 216 may be located internal to the base station 17. As discussed above, in some examples, the memory 210 may also store one or more predetermined interference conditions.

Interference detector 212 obtains physical channel information from LTE transmissions (signaling on a first frequency band) via processing system 204. Interference detector 212 compares the physical channel information with one or more predetermined interference conditions stored in database 218, to identify the presence of interference in the cell 20 associated with the base station 17.

The frequency band selector 214 receives an indication of the identified interference from the interference detector 212 and selects a second frequency band for LTE signaling. The frequency band selector 214 sends an indication of the selected second frequency band to the processing unit 208 of the processing system 210. The processing unit 208 sends an instruction to the UEs 13 in the cell 20, via the transceivers 202, to signal on the second frequency band. In some examples, UEs 13 can operate on two or more LTE frequency bands and can switch from one LTE band to another in response to the instruction. In other examples, however, one or more UEs 13 are capable of LTE signaling on the current band, but may not be able to switch between two LTE bands. For example, the UE 13-2 may be capable of signaling in the LTE band 13 (i.e., about 700 MHz), but may not be capable of operating in the LTE band 4 (i.e., about 1700 MHz uplink and about 2100 MHz downlink), although it may be able to operate on other technologies, e.g., on a legacy third generation radio technology. In such an example, the UE 13-2 can switch from the current LTE band to use an enhanced High Rate Packet Data (eHRPD) service on another/second band, for example, to switch from a first LTE frequency band (e.g., LTE band 13) to a second frequency band that is associated with EVDO signaling (e.g., a 1900 MHz EVDO signaling band for eHRPD). In some examples, one or more UEs 13, such as UE 13-2 may not be capable of LTE operation. The UE 13-2 can receive an instruction from processing unit 208 switching the UE 13-2 to an available (second) frequency band of a technology (not LTE) that the UE 13-2 is capable of using. In some examples, the frequency band selector 214 uses network provider preferences for different cellular technologies to select the second frequency band. For example, the frequency band selector 214 does not switch to another signaling technology (to select the second frequency band) if the selection would negatively impact UEs 13 currently using the second frequency band. Where the UE is on another technology when instructed to switch bands, the instruction may come from a different network element, for example, from a base transceiver system (BTS) instead of an eNB.

In some examples, the indication identifying interference (received from the interference detector 212) merely indicates the presence of interference in the first frequency band. Responsive to the indication, the frequency band selector 214 may select a second frequency band different from the first frequency band. In some examples, the first frequency band includes the LTE band 13 (about 700 MHz frequency band uplink and downlink) and the second frequency band includes the LTE band 4 (about 1700 MHz frequency band uplink and about 2100 MHz frequency band downlink), or vice versa.

In some examples, the indication identifying interference (received from the interference detector 212) includes one or more frequency sub-bands within the first frequency band in which the interference is identified. Responsive to the indication including the interference-corrupted sub-band, the frequency band selector 214 may select one or more sub-bands within the first frequency band that do not include the interference-corrupted sub-band.

In some examples, the interference mitigation controller 30 continues to monitor the physical channel information of LTE transmissions (currently signaling in the second frequency band) to determine whether interference is still present in the first frequency band. When the interference mitigation controller 30 determines that interference in the first frequency band is less than a predetermined threshold, the interference mitigation controller 30 sends an indication to the processing unit 208 to switch the LTE signaling back to the first frequency band.

In some examples, the interference mitigation controller 30 continues to monitor the physical channel information of LTE transmissions (currently signaling in the second frequency band) to determine whether interference is detected in the second frequency band. When the interference mitigation controller 30 detects interference in the second frequency band, the interference mitigation controller 30 sends an indication to the processing unit 208 to switch the LTE signaling back to the first frequency band.

In some examples, the interference mitigation controller 30 continues to monitor the physical channel information of LTE transmissions (currently signaling in the second frequency band) to determine whether interference is detected in the second frequency band and no longer detected in the first frequency band. When the interference mitigation controller 30 detects interference in the second frequency band and does not detect interference in the first band, the interference mitigation controller 30 sends an indication to the processing unit 208 to switch the LTE signaling back to the first frequency band.

As discussed above, interference mitigation controller 30 relies on physical channel information from LTE transmissions to identify the presence of interference. Next, a brief description of LTE is provided, prior to describing example physical channel information and example predetermined interference conditions used by interference mitigation controller 30.

LTE utilizes orthogonal frequency division multiplexing (OFDM) on the downlink and single-carrier frequency multiple access (SC-FDMA) on the uplink. LTE partitions the system bandwidth into multiple (K) orthogonal subcarriers (also commonly referred to as tones or frequency bins). Each subcarrier may be modulated with data, control or reference signals. In general, modulation symbols are sent in the frequency domain with OFDM and in the time domain with SC-FDMA.

Figure 3A:
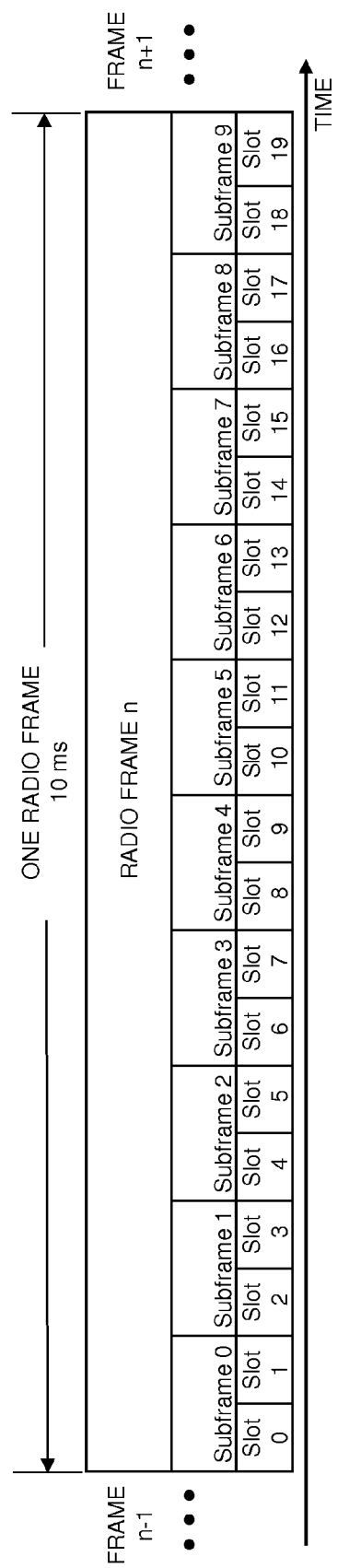
FIGS. 3A and 3B are diagrams illustrating an example of a radio frame structure in a wireless communication network.
Figure 3B:
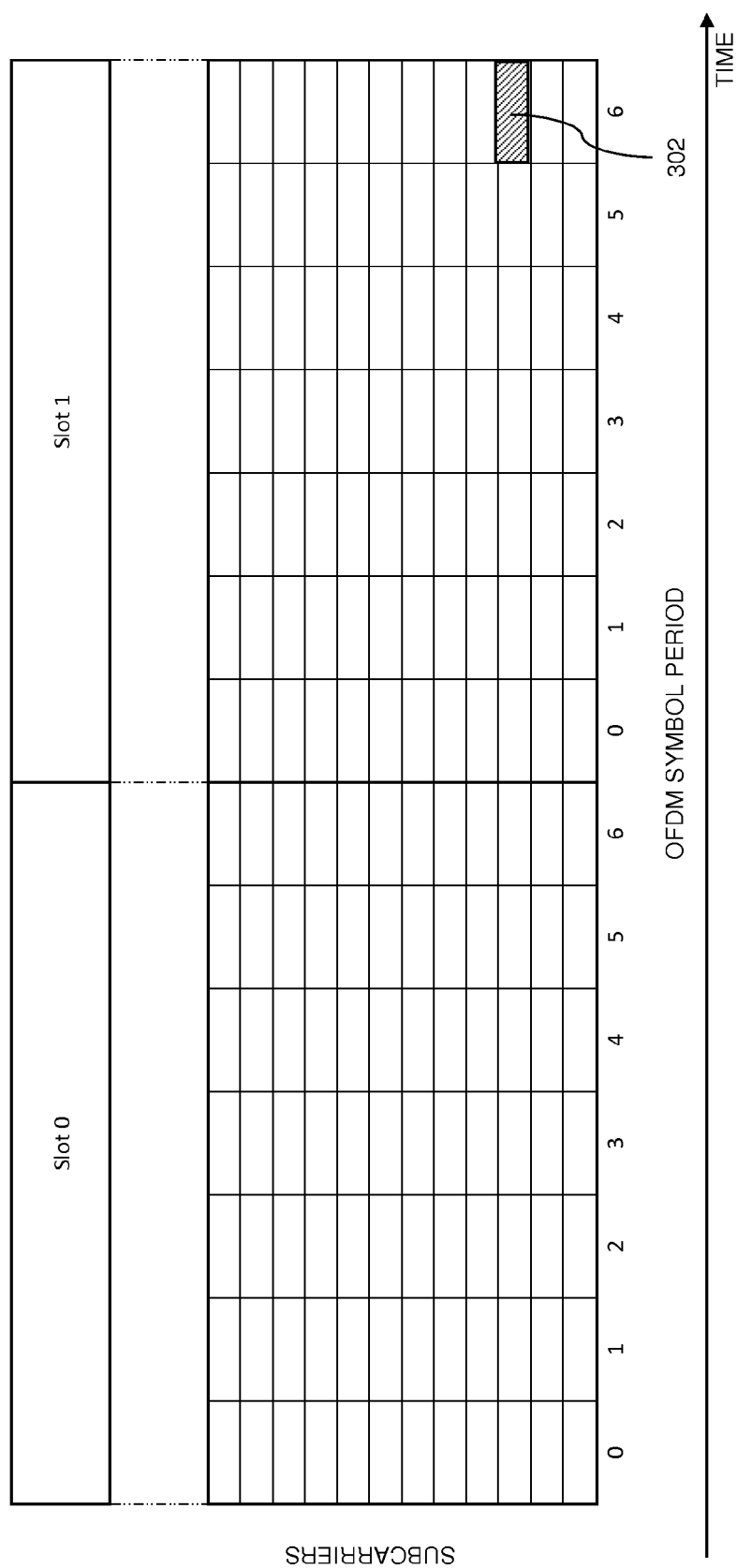

FIGS. 3A and 3B illustrate an example frame structure used in LTE. The frame structure may represent an uplink or a downlink. In particular, FIG. 3A is a diagram illustrating an example frame structure as a function of time; and FIG. 3B is a diagram of a subframe of the frame structure shown in FIG. 3A, illustrating the time-frequency arrangement of the frame structure.

The transmission timeline for the frame structure is partitioned into units of radio frames. Each radio frame (such as radio frame n) has a predetermined duration (e.g., 10 ms) and may be partitioned into 10 subframes with indices of 0 through 9. Each subframe may include two slots. Each radio frame may thus include 20 slots with indices of 0 through 19. Each slot includes L symbol periods (e.g., 7 symbol periods for a normal cyclic prefix (as illustrated in FIG. 3A) or 6 symbol periods for an extended cyclic prefix). Each slot is composed of OFDM symbols. The system bandwidth is also partitioned into subcarriers. A single subcarrier/OFDM symbol space represents a resource element 302.

The available time frequency resources are partitioned into resource blocks. Each resource block covers N subcarriers (e.g., 12 subcarriers) in one slot. The total number of resource blocks per slot depends on the size of the spectrum bandwidth. For example, the total number of resource blocks per slot may include 6 to 100 resource blocks per slot corresponding to a minimum bandwidth size of 1.4 MHz and a maximum size of 200 MHz. Resources are allocated based on 2 subframe intervals.

The spacing between adjacent subcarriers may be fixed, and the total number of subcarriers (K) may depend on the system bandwidth. For example, the spacing of the subcarriers may be 15 kHz and the minimum resource allocation (i.e., resource block) may be 12 subcarriers (or 180 kHz). The system bandwidth may also be partitioned into sub-bands. A sub-band may cover, for example, 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

A number of resource elements may be available in each symbol period. Each resource element 302 may cover one subcarrier in one symbol period and may be used to send one modulation symbol, which may be a real or complex value. One or more resource blocks are assigned to the UE 13 for communications on both of the uplink and downlink. The base station 17 determines to which UE 13 and which resource block to assign for each sub-frame via frequency scheduling. In the downlink, the base station 17 transmits a shared channel to the scheduled UE in one or more resource blocks. In the uplink, the selected UE transmits a shared channel to the base station 17 in one or more resource blocks. Physical channels carry information over the air interface between the base station 17 and the associated UEs 13. Each of the downlink and uplink includes several physical channels.

The downlink includes a Physical Downlink Control Channel (PDCCH) and a Physical Downlink Shared Channel (PDSCH). The PDCCH carries downlink allocation information and uplink allocation grants for a UE. The PDSCH is used for data transmission. The downlink includes other physical channels including a Physical Control Format Indicator Channel (PCFICH) (to signal the length of the PDCCH), a Physical Hybrid ARQ Indicator Channel (PHICH) (to carry acknowledges from uplink transmissions), a Physical Multicast Channel (PMCH) (for broadcast transmission using a Single Frequency Network) and a Physical Broadcast Channel (PBCH) (to broadcast system information within the cell 20).

The uplink includes a Physical Random Access Channel (PRACH) (for initial access and when the UE losses its uplink synchronization), a Physical Uplink Shared Channel (PUSCH) (for carrying data together with control information) and a Physical Uplink Control Channel (PUCCH) (for carrying control information).

Figure 4A:
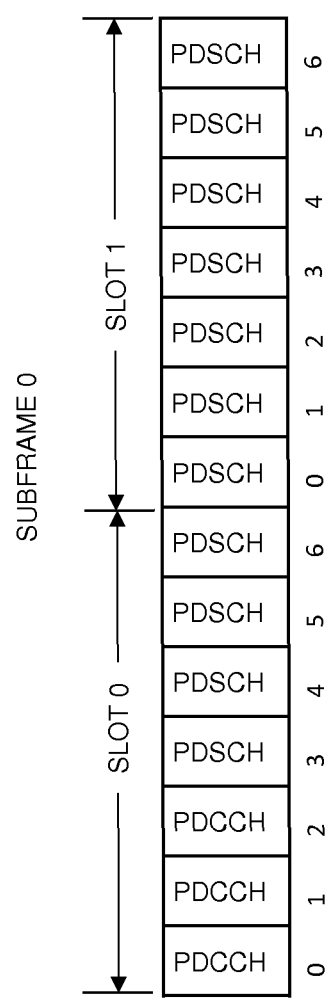
FIGS. 4A and 4B are diagrams illustrating an example resource allocation in a frame structure for downlink communication.
Figure 4B:
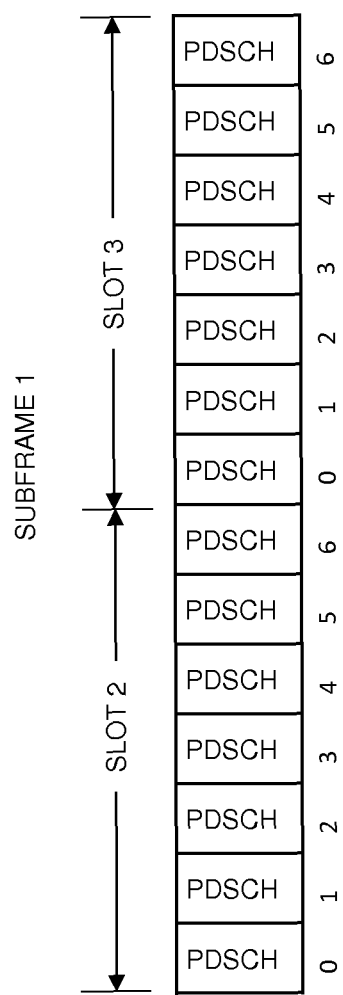

FIGS. 4A and 4B show an example resource allocation in a downlink frame structure for subframes 0 and 1, respectively. A PDCCH is provided in symbol periods 0-2 of subframe 0. The PDCCH may carry information on uplink and downlink resource allocation for UEs and power control information for uplink channels. The base station 17 may send a PDSCH in the remaining symbol periods of each subframe. The PDSCH may carry data for UEs scheduled for data transmission on the downlink.

FIGS. 5A and 5B show an example resource allocation in an uplink frame structure for subframes 0 and 1, respectively. A PUCCH and a PDSCH is provided in symbol periods of each subframe. A PDCCH is provided in symbol periods of subframe 1. Other signaling is provided in several symbol periods among subframes 0 and 1.

Referring back to FIG. 2, the interference detector 212 monitors the air interface for interference, by using physical channel information from an LTE transmission in the uplink and/or the downlink. On the uplink, PRACH, the PUSCH and/or the PUCCH may be probed. On the downlink, the interference detector 212 may monitor the PDCCH or the PDSCH to determine the presence of interference.

By probing the PRACH, the interference detector 212 can assess the level of interference on the channel that allows UEs 13 to synchronize with a timing (scheduled by the base station 17). The PRACH may be used to monitor UEs 13 moving into the coverage area of the cell 20 as well as for those UEs 13 that are out of sync with the timing.

In one example, the interference detector 212 may be triggered periodically (such as based on a predetermined monitoring period) to monitor the PRACH. The interference detector 212 may periodically compare a noise floor of the PRACH to a predetermined or premeasured noise floor (for example, about −80 dBm RSRP). The predetermined noise floor may be stored in the database 216. The predetermined noise floor may be determined based on normal traffic patterns. Some other source of signaling on the operation frequency may change the noise floor. For example, an excessively high noise floor (above the predetermined noise floor) may be indicative of interference. In some examples, the predetermined monitoring period may vary depending upon on how fast the interference changes from a previous period to the current period. For example, if there is little variation in the interference from the previous period to the current period, the duration of the monitoring period may remain the same or may be increased. If there is a large variation in the interference from the previous period to the current period, the duration of the monitoring period may be decreased.

For example, a typical noise floor for a high usage site may be about −94 dBm RSRP. Depending upon the time of day, the noise floor may fluctuate from about −120 dBm RSRP to about −94 dBm RSRP. For a low usage site, the typical noise floor may be about −118 dBm RSRP, and may fluctuate from about −120 dBm RSRP to about −115 dBm RSRP depending upon the time of day. Thus, for a high usage site, a noise floor greater than −85 dBm RSRP may be suspect as including interference. For a low usage site, a noise floor greater than −100 dBm RSRP may be suspect as including interference. It is also understood that a low usage site may become a high usage site for a short period of time (such as during a special event). Accordingly, a predetermined noise floor (threshold) may take into account the time of day, the typical site usage level and/or the occurrence of any events that may (legitimately) increase the amount of traffic on cell site.

As another example, the interference detector 212 may also monitor the PRACH, based on the number of UEs 13 with which the base station 17 interacts. If the number of UEs is a predetermined number of standard deviations below an expected amount (e.g., stored in database 216), that may be indicative of interference drowning out the UEs 13 attempting to synchronize with the base station 17 via the PRACH. As an example, if over a month a baseline has been established that at 5 pm on Mondays, the base station 17 sees on average 400 users a minute, but is currently seeing 0 or 1, this value may be indicative of an interference event.

The interference detector 212 may also monitor the PUSCH for interference. As one example, the noise level of the PUSCH may be compared to a predetermined noise level (e.g., stored in the database 218). If the noise level is greater than the predetermined noise level, it may be indicative of interference. In addition to the noise level, a sustained high noise level (i.e., greater than the predetermined noise level and longer than a predetermined duration) that is broadband (e.g., covers a majority of the frequency band (such as 700 MHz)) may be indicative of interference.

As another example, a timing of the PUSCH may be monitored to detect interference. Because the base station 17 schedules the UEs 13 on the PUSCH among the subframe, scheduling of the signaling across the air interface is known (and may be stored in database 216). Signaling (whether garbled or legitimate) during an unscheduled time, may be indicative of interference. Monitoring the PUSCH may be effective if an (unscheduled) party is looking to actively interfere with uplink signaling.

The PUCCH may be evaluated in the same manner at the PUSCH. Thus, the noise level of the PUCCH and/or the signal timing of the PUCCH may be monitored to identify the presence of interference.

On the downlink, the interference detector 212 may monitor the PDCCH similar to monitoring the PRACH. The PRACH is where the base station scheduler allocates downlink resources. If there is an excessively high noise floor (above that expected from typical traffic), then it may be indicative of higher interference. The interference detector 212 may also monitor the PDCCH, based on the number of UEs 13 with which the base station 17 interacts (similar to the PRACH). The PDSCH would be monitored like the PUSCH. Thus, the noise level of the PDSCH and/or the signal timing of the PDSCH may be monitored to identify the presence of interference.

Additionally, resources are allocated in the LTE transmission in the PDCCH, PUCCH, and/or PUSCH to the UEs 13 (according to the frequency scheduling). If a predetermined (excessive) number of the UEs 13 fail to send data during their allocated window or respond with acknowledgements to data that is sent during their dedicated windows, then the interference detector 212 may determine that the cell 20 experiences interference. For example, if the base station scheduler schedules x subcarrier frequencies for 100 UEs 13 but only receives an acknowledgement from 10 UEs 13, the cell 20 may be experiencing interference. There are also legitimate reasons why a particular UE 13 would not send signaling where expected. For example, the UE 13 may be handed over to a different cell (such as the cell 20-2 from the cell 20-1) or the UE 13 may have finished a transmission and no longer needs the allocated resources. The interference detector 30 may distinguish these legitimate reasons from a failure to receive data/acknowledgements in order to determine whether interference is detected.

As another example, the interference detector 212 may monitor the noise floor of all incoming signaling. For example, if the interference detector 212 determines that 25% of all incoming measurements are above about −107 dBm RSRP on the 700 MHz band, the interference detector 212 may identify the presence of interference. As another example, the interference detector 212 may monitor the noise floor of all incoming signaling to determine which frequencies in the operating frequency band drop below a predetermined level, to identify sub-bands containing interference.

The database 218 may store any suitable predetermined interference condition. Examples of predetermined interference conditions include, without being limited to a predetermined noise floor, a predetermined number of UEs 13 expected to interact, a predetermined noise level, a predetermined signaling time schedule, information regarding resources allocated, a number of UEs associated with the allocated resources and/or one or more predetermined sub-bands of the first frequency band (associated with corresponding predetermined noise levels (and/or noise floors) of the first frequency band.

Figure 6:
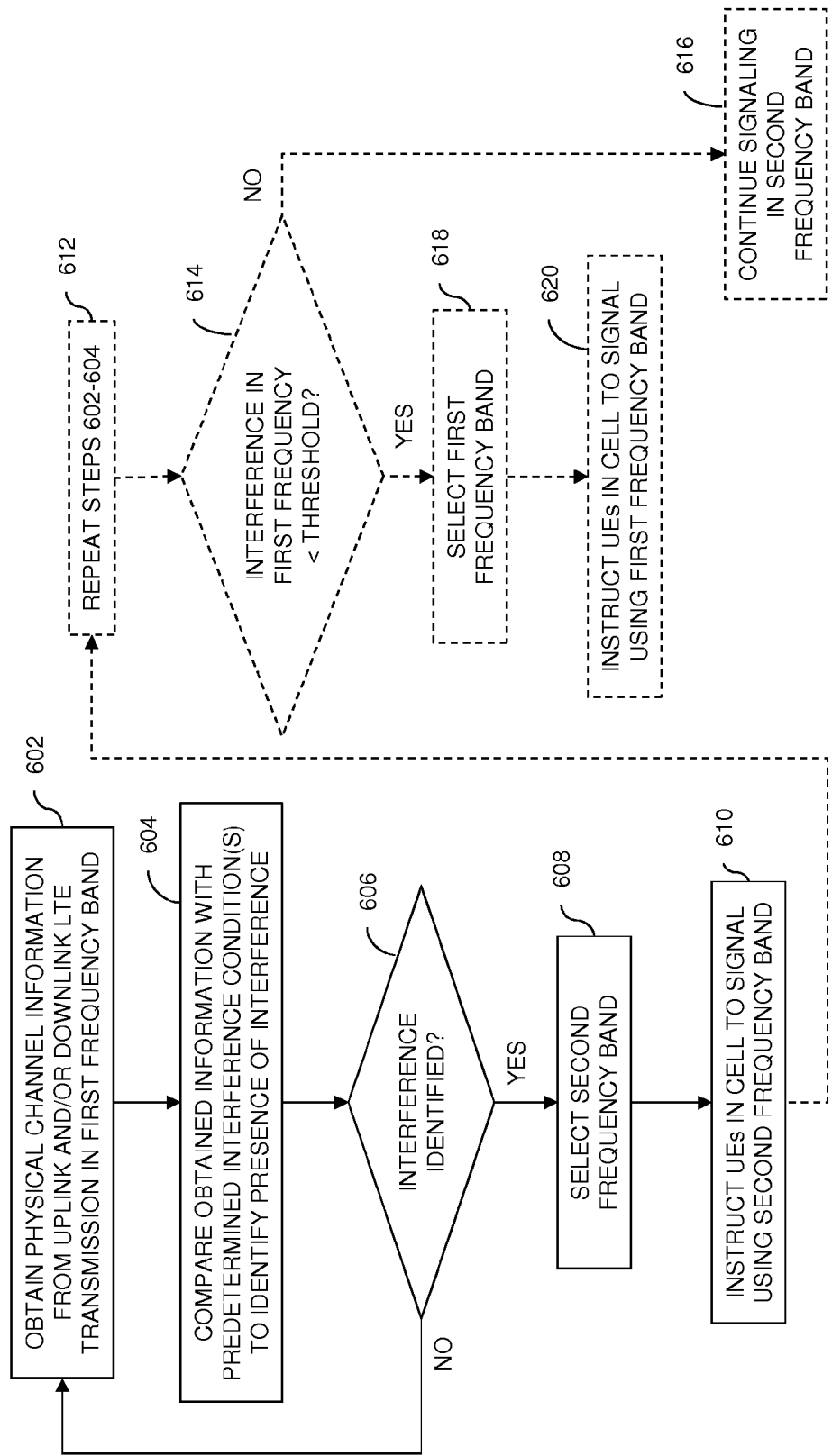
FIG. 6 is a flow chart diagram illustrating an example of interference mitigation control based on physical channel information.

FIG. 6 is a flow chart diagram illustrating an example of interference mitigation control based on physical channel information. At step 602, physical channel information is obtained from an LTE transmission in a first frequency band, for example, by the interference detector 212. The LTE transmission may be from uplink communication and/or from downlink communication.

At step 604, the obtained physical channel information is compared (e.g., by the interference detector 212) with one or more predetermined interference conditions (e.g., stored in the database 216), to identify the presence of interference. At step 606, it is determined (e.g., by the interference detector 212) whether interference is identified, based on the comparison in step 604. In addition to identifying the presence of interference, in some examples, the identification may include an indication of sub-bands in which the interference is identified (and/or sub-bands in which interference is not identified). Examples of steps 604 and 606 are described below with respect to FIGS. 7A-7C.

If it is determined, at step 606, that interference is not identified, step 606 proceeds to step 602. Steps 602-606 may be repeated periodically (e.g., by the interference detector 212) to monitor the cell 20 for interference.

If it is determined, at step 606, that interference is identified, step 606 proceeds to step 608. For example, the interference detector 212 provides an indication to the frequency band selector 214 that interference is identified. In some examples, the indication also includes information on sub-bands in which the interference is identified (and/or in which interference is not identified). At step 608, a second frequency band is selected (e.g., by the frequency band selector 214), responsive to the indication (e.g., from the interference detector 212) of the identified interference (step 606). In some examples, the frequency band selector 214, responsive to the indication, selects a second frequency band different from the first frequency band (i.e., having no overlapping frequencies with the first frequency band). In other examples, the frequency band selector 214 selects a second frequency band that includes a portion of the first frequency band (i.e., includes one or more sub-bands of the first frequency band but does not include a sub-band(s) identified as including interference).

At step 610, an instruction is sent to the UEs 13 in the cell 20 (for example, to UEs 13-1, 13-2 in the cell 20-1) to signal using the second frequency band (selected in step 608). For example, the frequency band selector 214 sends a request to the processing unit 208 to begin signaling on the (selected) second frequency band. Responsive to the request, the processing unit 208 sends an instruction to the UEs 13 via transceiver 202 to begin signaling on the second frequency band.

In some examples, the database 216 (or another database in the network 10) stores a record of the physical channel information that triggered the interference identification, along with a time stamp of when the identification occurred. The stored information may be used by technicians to identify and/or mitigate the source of the interference on the first frequency band.

In some examples, the method includes optional steps 612-620. In step 612, steps 602-604 are repeated (e.g., by the interference detector 212) for the first frequency band. In step 614, it is determined (e.g., by the interference detector 212) whether interference in the first frequency band is less than a predetermined threshold.

If it is determined, at step 614, that interference in the first frequency band is greater than the predetermined threshold, step 614 proceeds to step 616. At step 616, signaling continues in the second frequency band.

If it is determined, at step 614, that interference in the first frequency band is less than the predetermined threshold, step 614 proceeds to step 618. At step 618, the first frequency band is selected. For example, the interference detector 212 provides an indication to the frequency band selector 214 that interference in the first frequency band is no longer identified.

At step 620, an instruction is sent to the UEs 13 in the cell 20 (for example, to UEs 13-1, 13-2 in the cell 20-1) to signal using the first frequency band (selected in step 618). For example, the frequency band selector 214 sends a request to the processing unit 208 to begin signaling on the first frequency band. Responsive to the request, the processing unit 208 sends an instruction to the UEs 13 via transceiver 202 to begin signaling on the first frequency band.

Figure 7C:
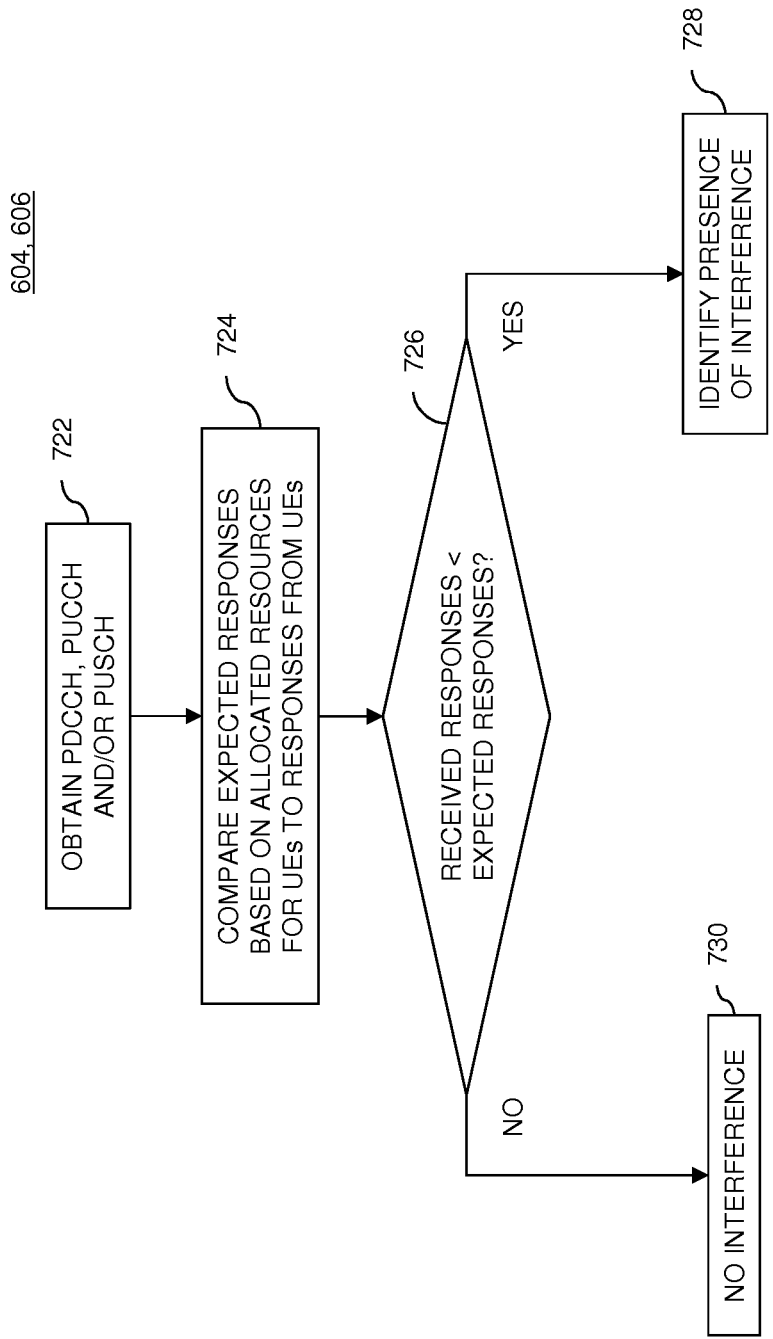
FIG. 7C is a flow chart diagram illustrating another example of interference identification based on physical channel resource allocation information.

FIG. 7A-7C are flow chart diagrams illustrating examples of identifying the presence of interference. In particular, FIG. 7A illustrates an example of identification using a noise level and/or unscheduled timing information for at least one physical channel (e.g., the PUSCH, the PUCCH and/or the PDSCH); FIG. 7B illustrates an example of identification using a noise floor and/or an expected number of UEs for at least one physical channel (e.g., the PRACH and/or the PDCCH); and FIG. 7C illustrates an example of identification based on physical channel resource allocation information for at least one physical channel (e.g., the PDCCH, the PUCCH and/or the PUSCH).

Referring to FIG. 7A, at step 702, at least one of the PUSCH, PUCCH or PDSCH (i.e., physical channels for signaling in the first frequency band) is obtained. At step 704, a noise level of the obtained physical channel(s) (in step 702) is compared with a predetermined noise level (e.g., stored in the database 216).

If it is determined, at step 704, that the noise level is greater than the predetermined noise level, step 704 proceeds to step 706. At step 706, the presence of interference is identified. Although not shown, step 704 may also identify sub-bands in which the noise level is greater than the predetermined noise level. Step 706 may, thus, also identify the presence of interference in one or more sub-bands (based on step 704).

If it is determined, at step 704, that the noise level is less than or equal to the predetermined noise level, step 704 proceeds to step 708. At step 708, it is determined whether the obtained physical channel (i.e., the PUSCH, the PUCCH and/or the PDSCH) is signaled at an unscheduled time. If it is determined, at step 708, that the physical channel is signaled at an unscheduled time, step 708 proceeds to step 706, and the presence of interference is identified.

If it is determined, at step 708, that the physical channel is not signaled at an unscheduled time, step 708 proceeds to step 710, and the presence of interference is not identified.

Referring to FIG. 7B, at step 712, at least one of the PRACH or PDCCH (i.e., physical channels for signaling in the first frequency band) is obtained. At step 714, a noise floor of the obtained physical channel(s) (in step 712) is compared with a predetermined noise floor (e.g., stored in the database 216).

If it is determined, at step 714, that the noise floor is greater than the predetermined noise floor, step 714 proceeds to step 716. At step 716, the presence of interference is identified. Although not shown, step 714 may also identify sub-bands in which the noise floor is greater than the predetermined noise floor. Step 716 may, thus, also identify the presence of interference in one or more sub-bands (based on step 714).

If it is determined, at step 714, that the noise floor is less than or equal to the predetermined noise floor, step 714 proceeds to step 718. At step 718, it is determined whether the number of UEs 13 for the obtained physical channel (i.e., the PRACH and/or the PDCCH) is less than a predetermined threshold (for an expected number of UEs). If it is determined, at step 718, that the number of UEs 13 less than the predetermined threshold, step 718 proceeds to step 716, and the presence of interference is identified.

If it is determined, at step 718, that the number of UEs 13 is greater than or equal to the predetermined threshold, step 718 proceeds to step 720, and the presence of interference is not identified.

Referring to FIG. 7C, at step 722, at least one of the PDCCH, PUCCH or PUSCH (i.e., physical channels for signaling in the first frequency band) is obtained. At step 724, allocated resources for UEs 13 communicating on the cell 20 (e.g., stored in the database 216) are compared with responses from the respective UEs 13, based on the obtained physical channel(s) (in step 722). For example, the responses may include data responses or acknowledgement response by the UEs 13. The allocated resources are used to identify an expected number of responses to receive from the UEs. At step 726, it is determined whether the received number of responses is greater than the expected number of responses (based on the allocated resources).

If it is determined, at step 726, that received number of responses is less than the expected number of responses, step 726 proceeds to step 728 and, at step 728, the presence of interference is identified.

If it is determined, at step 726, that the received number of responses is greater than or equal to the expected number of responses, step 726 proceeds to step 730, and, at step 730, the presence of interference is not identified.

As shown by the above discussion, functions relating to the interference mitigation control service may be implemented on computers connected for data communication via the components of a packet data network, operating as various servers and/or user terminals, as shown in FIG. 1. Although special purpose devices may be used for servers operating as an interference mitigation controller, such devices also may be implemented using one or more hardware platforms intended to represent a general class of data processing device commonly used to run "server" programming so as to implement the interference mitigation control functions discussed above, albeit with an appropriate network connection for data communication. UEs such as 13-1, 13-2, 13-3 similarly may be implemented on general purpose computers, albeit with appropriate user interface elements and programming.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the interference mitigation control service. For each of the various server platforms, the software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the interference mitigation control service, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server, including the interference mitigation controller 30. FIG. 9 depicts a computer with user interface elements, as may be used to implement a personal computer or other type of work station or terminal device, although the computer of FIG. 9 may also act as a server if appropriately programmed. It is believed that the general structure and general operation of such equipment as shown in FIGS. 8 and 9 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the interference mitigation control service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has a large number of acronyms to refer to various devices, messages and system components. Although generally known, use of several of these acronyms is not strictly standardized in the art. For the convenience of the reader, the following list correlates terms to acronyms, as used by way of example in the detailed description above.

ASIC—Application Specific Circuit
AWS—Advanced Wireless Services
CDMA—Code Division Multiple Access
CD-ROM—Compact Disk Read Only Memory
CPU—Central Processing Unit
DL—Downlink
DVD—Digital Video Disk
DVD-ROM—Digital Video Disk Read Only Memory
eHRPD—Enhanced High Rate Packet Data
eNB, eNodeB—Evolved Node B
EPC—Evolved Packet Core
EEPROM—Electrically Erasable Programmable Read Only Memory
EPROM—Erasable Programmable Read Only Memory
FEC—Forward Error Correction
FLASH-EPROM—Flash Erasable Programmable Read Only Memory
FPGA—Field Programmable Gate Array
IP—Internet Protocol
LTE—Long Term Evolution
MME—Mobility Management Entity
OFDM—Orthogonal Frequency Division Multiplexing
OFDMA—Orthogonal Frequency-Division Multiple Access
PBCH—Physical Broadcast Channel
PCFICH—Physical Control Format Indicator Channel
PDCCH—Physical Downlink Control Channel
PDN—Packet Data Network
PDSCH—Physical Downlink Shared Channel
PHICH—Physical Hybrid ARQ Indicator Channel
PMCH—Physical Multicast Channel
PRACH—Physical Random Access Channel
PROM—Programmable Read Only Memory
PSTN—Public Switched Telephone Network
PUCCH—Physical Uplink Control Channel
PUSCH—Physical Uplink Shared Channel
QPSK—Quadrature Phase Shift Keying
RAM—Random Access Memory
RF—Radio Frequency
ROM—Read Only Memory
RSRP—Reference Signal Receive Power
SC-FDMA—Single-Carrier Frequency Multiple Access
SGW—Serving Gateway
TDMA—Time Division Multiple Access
UE—User Equipment
UL—Uplink
WCDMA—Wideband Code Division Multiple Access

What is claimed is:
1. A method, comprising:
obtaining, by an interference mitigation controller that is implemented at least partially in hardware, physical channel information of a transmission, signaled in a first frequency band, between a base station and at least one user equipment (UE) associated with the base station, the transmission corresponding to at least one of an
uplink communication or a downlink communication;

comparing, by the interference mitigation controller, the
obtained physical channel information to a predetermined interference condition,
the obtained physical channel information including a
quantity of responses received from the at least one
UE, and
the predetermined interference condition including an
expected quantity of responses to be received from
the at least one UE;

identifying, by the interference mitigation controller, a
presence of interference in the transmission based on
the comparison;

selecting, by the interference mitigation controller, a
second frequency band based on the identified presence
of interference,
the second frequency band being different from the first
frequency band, and
at least one of the first frequency band or the second
frequency band including a Long Term Evolution
(LTE) band; and sending, by the interference mitigation controller, an
instruction to switch, from signaling using the first
frequency band, to signaling using the second frequency band based on the identified presence of interference.

2. The method of claim 1, wherein the transmission includes the downlink communication, and
wherein the physical channel information includes information of at least one of:
a Physical Downlink Control Channel (PDCCH), or
a Physical Downlink Shared Channel (PDSCH).

3. The method of claim 1, wherein the transmission includes the uplink communication, and
wherein the physical channel information includes information of at least one of:
a Physical Random Access Channel (PRACH),
a Physical Uplink Shared Channel (PUSCH), or
a Physical Uplink Control Channel (PUCCH).

4. The method of claim 1, wherein the predetermined interference condition further includes at least one of:
a predetermined noise floor,
a predetermined noise level,
a predetermined signaling time schedule,
resource allocation information,
a predetermined quantity of UEs associated with the allocated resource information, or
at least one predetermined sub-band of the first frequency band.

5. The method of claim 1, wherein frequencies in the first frequency band do not overlap with frequencies in the second frequency band.

6. The method of claim 1, wherein identifying the presence of interference in the transmission based on the comparison includes:
identifying at least one sub-band of frequencies, within the first frequency band, including the identified presence of interference; and
wherein selecting the second frequency band includes:
selecting the second frequency band based on the identified at least one sub-band.

7. The method of claim 6, wherein the second frequency band includes a portion of the first frequency band excluding the identified at least one sub-band.

8. The method of claim 1, further comprising:
periodically obtaining the physical channel information and comparing the obtained physical channel information to the predetermined interference condition according to a predetermined monitoring period; and
identifying the presence of interference in the transmission based on periodically obtaining the physical channel information and comparing the obtained physical channel information to the predetermined interference condition according to the predetermined monitoring period.

9. The method of claim 1, further comprising:
repeating, based on sending the instruction, the obtaining the physical channel information and the comparing the obtained physical channel information to the predetermined interference condition;
selecting, by the interference mitigation controller, the first frequency band based on the presence of interference in the first frequency band being less than a predetermined threshold; and
sending, by the interference mitigation controller, a second instruction to switch back from signaling using the second frequency band to signaling using the first frequency band.

10. The method of claim 1, wherein the first frequency band includes an LTE band 13 and the second frequency band includes an LTE band 4.

11. A system, comprising:
an interference mitigation controller that is implemented at least partially in hardware, communicatively coupled to a base station via a wireless communication network, to:
obtain physical channel information, from the base station, of a transmission signaled, in a first frequency band, between the base station and at least one user equipment (UE),
the transmission corresponding to at least one of an uplink communication or a downlink communication;
compare the obtained physical channel information to at least one predetermined interference condition stored in a database,
the obtained physical channel information including a quantity of responses received from the at least one UE, and
the at least one predetermined interference condition stored in the database including an expected quantity of responses to be received from the at least one UE;
identify a presence of interference in the transmission based on comparing the obtained physical channel information to the at least one predetermined interference condition stored in the database;
select a second frequency band based on identifying the presence of interference,
the first frequency band being different from the second frequency band, and
at least one of the first frequency band or the second frequency band including a Long Term Evolution (LTE) band; and
send an instruction to switch, from signaling using the first frequency band, to signaling using the second frequency band based on selecting the second frequency band.

12. The system of claim 11, wherein the physical channel information includes information of at least one of:
   a Physical Downlink Control Channel (PDCCH),
   a Physical Downlink Shared Channel (PDSCH),
   a Physical Random Access Channel (PRACH),
   a Physical Uplink Shared Channel (PUSCH), or
   a Physical Uplink Control Channel (PUCCH).

13. The system of claim 11, wherein the at least one predetermined interference condition further includes at least one of:
   a predetermined noise floor,
   a predetermined noise level,
   a predetermined signaling time schedule,
   resource allocation information,
   a predetermined quantity of UEs associated with the allocated resource information, or
   at least one predetermined sub-band of the first frequency band.

14. The system of claim 11, wherein frequencies in the first frequency band do not overlap with frequencies in the second frequency band.

15. The system of claim 11, wherein the interference mitigation controller is further to:
   identify at least one sub-band of frequencies, within the first frequency band, including the identified presence of interference, and
   wherein the interference mitigation controller, when selecting the second frequency band, is to:
      select the second frequency band to include a portion of the first frequency band excluding the identified at least one sub-band.

16. The system of claim 11, wherein the database is configured to store physical channel information among the obtained physical channel information associated with the identified presence of interference.

17. A non-transitory computer readable medium storing instructions, the instructions comprising:
   one or more instructions that, when executed by one or more processors, cause the one or more processors to:
      obtain physical channel information of a transmission, signaled in a first frequency band, between a base station and at least one user equipment (UE) associated with the base station,
         the transmission corresponding to at least one of an uplink communication or a downlink communication;
      compare the obtained physical channel information to a predetermined interference condition,
         the obtained physical channel information including a quantity of responses received from the at least one UE, and
         the predetermined interference condition including an expected quantity of responses to be received from the at least one UE;
      identify a presence of interference in the transmission based on comparing the obtained physical channel information to the predetermined interference condition;
      select a second frequency band, different from the first frequency band, based on identifying the presence of interference; and
      send an instruction to switch, from signaling using the first frequency band, to signaling using the second frequency band based on selecting the second frequency band,
         at least one of the first frequency band or the second frequency band including a Long Term Evolution (LTE) band.

18. The non-transitory computer readable medium of claim 17, wherein the predetermined interference condition includes at least one of:
   a predetermined noise floor,
   a predetermined noise level,
   a predetermined signaling time schedule,
   resource allocation information,
   a predetermined quantity of UEs associated with the allocated resource information, or
   at least one predetermined sub-band of the first frequency band.

19. The non-transitory computer readable medium of claim 17, wherein the one or more instructions, that cause the one or more processors to select the second frequency band, cause the one or more processors to:
   select the second frequency band such that frequencies in the first frequency band do not overlap with frequencies in the second frequency band.

20. The non-transitory computer readable medium of claim 17, wherein the one or more instructions, that cause the one or more processors to select the second frequency band, cause the one or more processors to:
   identify at least one sub-band of frequencies, within the first frequency band, including the identified presence of interference; and
   select the second frequency band to include a portion of the first frequency band excluding the identified at least one sub-band.

* * * * *